United States Patent

[11] 3,609,220

[72] Inventor Lawrence R. Poel
Elmhurst, Ill.
[21] Appl. No. 829,934
[22] Filed June 3, 1969
[45] Patented Sept. 28, 1971
[73] Assignee Warwick Electronics Inc.

[54] VERTICAL SCAN CIRCUIT
9 Claims, 3 Drawing Figs.

[52] U.S. Cl. ........................................................ 178/7.3 R, 178/69.5 TV, 331/17, 331/20, 331/145
[51] Int. Cl. ........................................................ H04n 5/04
[50] Field of Search ............................................ 178/7.3 R, 7.5 R, 69.5 TV; 331/20, 34, 16, 17, 143, 144, 145, 146, 153, 177

[56] References Cited

UNITED STATES PATENTS 3,311,701 3/1967 Lynch ........................... 178/69.5

*Primary Examiner*—Robert L. Richardson
*Attorney*—Hofgren, Wegner, Allen, Stellman & McCord

ABSTRACT: A vertical scan circuit for a television receiver in which a free-running oscillator is synchronized by the vertical synchronizing component of the received signal. The free-running frequency of the vertical oscillator is varied in accordance with the amplitude of the received television signal.

INVENTOR
Lawrence R. Poel

BY Hofgren, Wegner, Allen, Stellman & McCord
ATTORNEYS

VERTICAL SCAN CIRCUIT

This invention relates to a deflection circuit for a cathode ray tube and more particularly to the vertical scanning circuit of a television receiver.

The vertical scanning frequency for commercial television in the United States is 60 Hz. A synchronizing pulse transmitted with the television signal terminates the vertical scan, initiating retrace and the start of the next scan. Successive vertical scans are offset in time by one-half the horizontal line spacing, providing an interlace of successive frames.

It is common practice in the vertical deflection circuit of a television receiver to utilize a multivibrator oscillator operating at a frequency slightly below the frequency of the transmitted scan synchronizing signals. The oscillator is triggered by the received synchronizing pulses so that it operates in synchronism with the received signal and the picture is properly displayed. It is desirable to have the free-running frequency of the oscillator several Hz. below the 60 Hz. frequency of the received signal. This enables the signal to recover rapidly if the synchronizing signal is lost as sometimes happens, particularly during a change in channel. If the free-running frequency of the oscillator is very close to the frequency of the synchronizing signals, the picture will tend to roll slowly and may take several seconds to stabilize.

A wide separation or displacement of the free-running frequency from 60 Hz. is undesirable, however, where the signal is weak, as in fringe areas. With a weak signal, the synchronizing pulse may be masked or lost in noise pulses, and in an extreme case may drop below the amplitude necessary to trigger the oscillator, if the free-running frequency is substantially below 60 Hz.

In accordance with the invention, the free-running frequency of the oscillator is varied in accordance with the signal amplitude. With a strong signal being received, the difference between the free-running frequency and the scanning frequency is greater than with a weak received signal.

One feature of the invention is the provision of a scan circuit including an oscillator with a free-running frequency different from the frequency of the scan synchronizing information, means for utilizing the scan synchronizing information to modify the oscillator frequency and means responsive to amplitude of the received signal for varying the free-running frequency of the oscillator. More particularly, the oscillator includes a circuit device which changes condition in accordance with a control potential and has a reactive circuit for developing the time varying control potential for the circuit device. The scan synchronizing information is added to the time-varying control potential to effect the change in condition of the circuit device, and the time varying control potential is modified in accordance with the amplitude of the received signal.

Another feature is that the oscillator is a multivibrator with one portion which conducts while the other portion is cut off during the scan period, the other portion having a control element to which the time varying control potential is applied and means for varying a bias on the control element in accordance with the amplitude of received signal.

A further feature is that the free-running frequency of the oscillator is established at a frequency which is less than the frequency of the scan synchronizing information and the difference between the two frequencies is a direct function of the amplitude of the received signal.

Further features and advantages of the invention will readily be apparent from the following specification and from the drawings, in which.

A television picture is produced by scanning the face of a cathode-ray tube with an electron beam. The beam is deflected both horizontally and vertically to scan a series of horizontal lines moving successively from the top to the bottom of the screen; and is amplitude modulated during the canning to reproduce the picture on the face of the tube. Scanning is effected by sawtooth currents caused to flow in horizontal and vertical deflection coils around the neck of the tube. The video information in the television signal is transmitted on a line-by-line basis, with each line initiated by a synchronizing pulse utilized to synchronize the horizontal scanning system. At appropriate intervals a vertical synchronizing signal is transmitted which controls the operation of the vertical scanning circuit. This invention is concerned particularly with the vertical scanning circuit where the synchronizing information is utilized to trigger the vertical oscillator, as contrasted with the horizontal system in which the received synchronizing signals are compared with the operation of the horizontal oscillator in a phase comparator, to develop a frequency modifying control signal. The invention is illustrated herein as incorporated in a vertical deflection circuit based on a commonly used plate coupled multivibrator. Other oscillator circuits could also be used.

Figure 1:
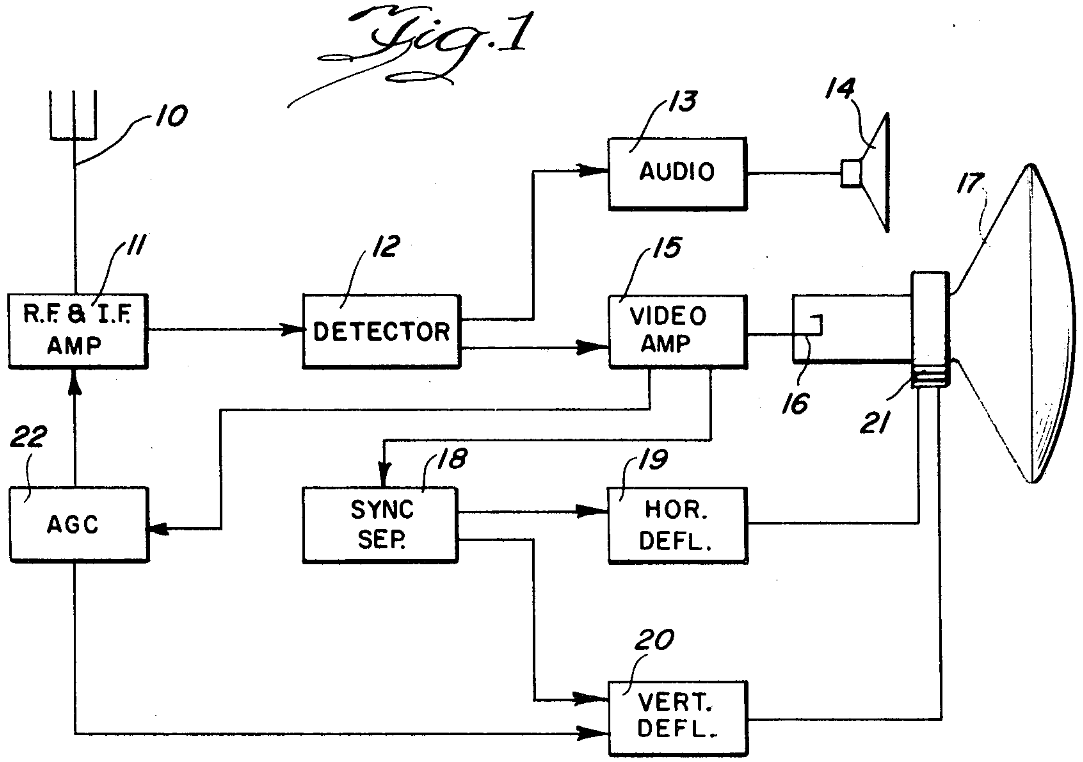
FIG. 1 is a block diagram of a television receiver incorporating the invention.

Turning now to FIG. 1, the television signal received by an antenna 10 is connected with radiofrequency and intermediate frequency tuned amplifiers 11 which select and amplify the desired signal. The output of the intermediate frequency amplifier is coupled to a detector 12, which has two outputs. The audio information is coupled through amplifier 13 to a speaker 14. The video signal is connected with a video amplifier 15 from which the picture information is connected to the cathode 16 of display tube 17. The synchronizing components of the television signal are derived from an output of the video amplifier by synchronizing signal separator 18 and connected with both the horizontal and vertical deflection circuits 19 and 20, respectively. The deflection signals are connected with deflection coils 21 mounted on the neck of tube 17.

Another output of the video amplifier 15 is connected with an automatic gain control circuit 22 which establishes a control potential which is a function of the amplitude of the received signal. This control potential is utilized to control the gain of the radiofrequency and intermediate frequency amplifier 11 and, in accordance with the present invention, modifies the operation of the vertical deflection circuit 20.

Figure 2:
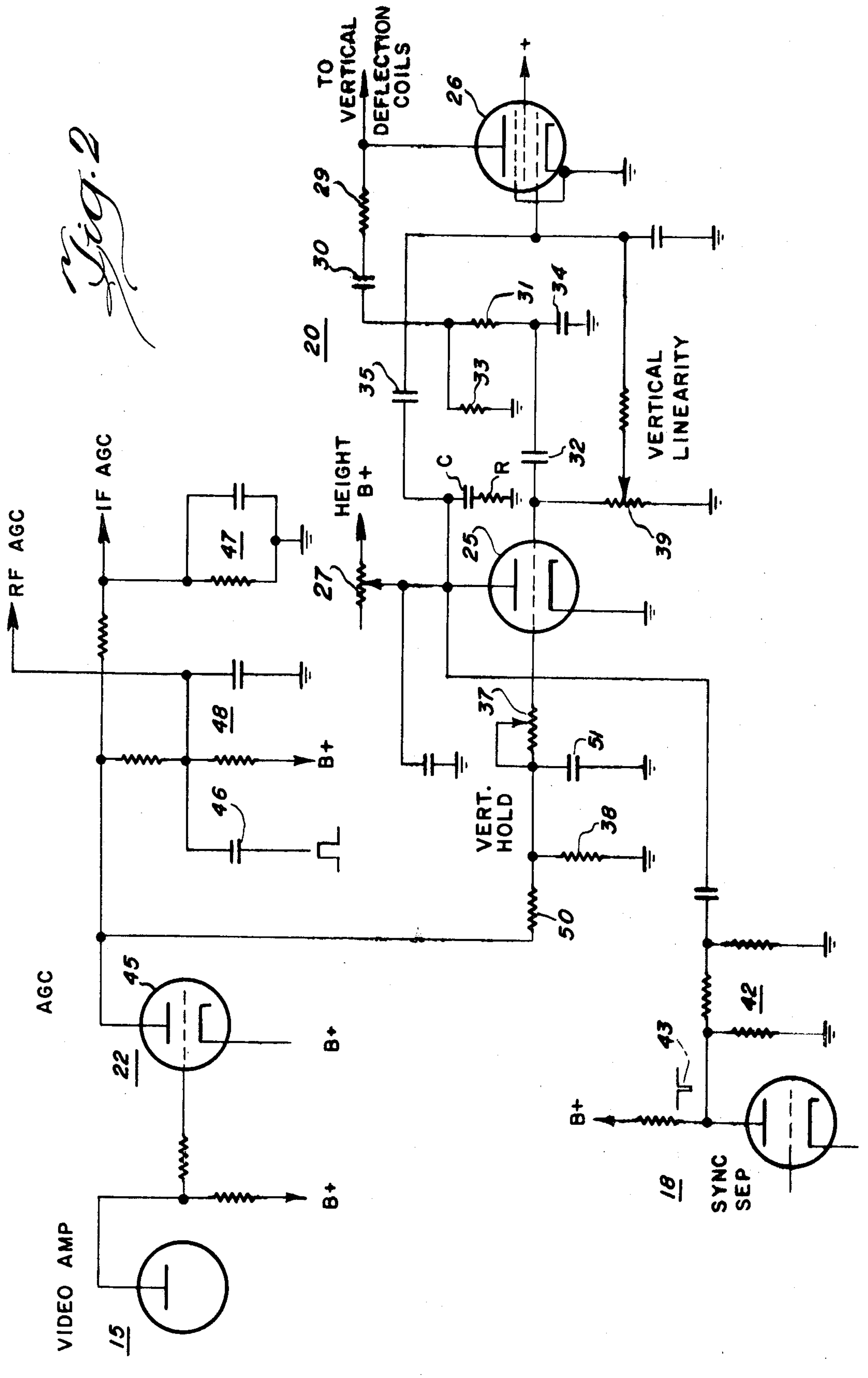
FIG. 2 is a schematic diagram of an oscillator circuit illustrating the invention.

In FIG. 2 the vertical deflection circuit 20 is a plate coupled multivibrator utilizing a triode section 25 and a pentode section 26 which also provides the necessary current output to the deflection coil 21. During the vertical scan period, pentode 26 conducts and triode 25 is cut off. At the end of the scan period, triode 25 conducts for the short retrace period, following which pentode 26 again conducts.

Considering first the basic multivibrator circuit, triode 25 has its cathode grounded and its plate connected with a source of operating potential through height control potentiometer 27. Pentode 26 also has its cathode returned to ground and its plate is connected through the vertical deflection coils with a source of operating potential. The screen grid is also connected with a source of operating potential. The plate of pentode 26 is coupled with the control grid of triode 25 through a filter network which includes series resistor 29, series capacitor 30, series resistor 31 and series capacitor 32. Resistor 33 is connected between the junction of capacitor 30 and resistor 31 to ground, while capacitor 34 is connected from the junction of resistor 31 and capacitor 32 to ground. The coupling network applies the positive pulse which occurs when the pentode ceases conduction to the control grid of the triode, driving it into conduction. The resistive and the capacitive elements filter out high frequency components and establish the proper voltage amplitude.

Similarly, the plate of triode 25 is connected with the control grid of pentode 26 through capacitor 35. Control grid of triode 25 is returned to ground through potentiometer 37, a vertical hold control and resistor 38, and the control grid of pentode 26 is returned to ground through potentiometer 39, a vertical linearity control.

Ignoring for the time being the effect of the vertical synchronizing signal, the multivibrator operates in the following manner. While pentode 26 is conducting, triode 25 is cut off by a negative potential on the control grid, due to a charge on capacitor 32. This charge is drained off through potentiometer 37 and resistor 38. The circuit also includes resistors 31 and 33. The exponential discharge of capacitor 32 is illustrated by solid line curve 56 in FIG. 3, which is a plot of the voltage on the grid of tube 25 versus time. As can be seen, when the voltage on the grid falls to the cutoff level the tube will begin to conduct. When this occurs the voltage at the plate drops and a negative pulse is coupled through capacitor 35 to the control grid of pentode 26, causing it to cease conduction. The positive pulse at the plate of pentode 26 is coupled through the filter network and capacitor 32 to the control grid of the triode, driving it further into conduction and drawing grid current to charge capacitor 32, applying a negative potential to the triode control grid. The time constants of the circuit are such that the triode conducts only during the retrace portion of the vertical scanning period. The triode acts as a switch to discharge the discharge or sawtooth capacitor C. The rapid discharge of capacitor C through triode 25 also generates a substantial negative pulse across peaking resistor R which further back biases pentode 26 and insures cutoff.

When the positive pulse on the grid of triode 25 terminates (as determined by the term constant of the feed back network) conduction therethrough will also terminate due to the grid-leak bias on capacitor 32. With triode 25 cutoff, capacitor C will begin to linearly charge toward $B^{++}$ whereby pentode 26 is caused to conduct a linearly increasing i.e. sawtooth, current through the vertical deflection coils. This latter described conduction period defines the trace interval.

Absent a triggering signal, triode 25 will initiate retrace when capacitor 32 has discharged to the point where the triode begins to conduct. As previously described, conduction in the triode causes the regenerative cut off of the pentode and saturation conduction in the triode. The position of the wiper contact of potentiometer sets the operating point of pentode and thus is effective to control linearity.

The operation of the vertical multivibrator 20 is triggered by vertical synchronizing pulses 15 from synchronizing signal separator 18. The pulses, with a negative orientation, are connected through a filter 42, which removes the horizontal synchronizing frequency and extraneous noise, to the plate of triode 25 and, through coupling capacitor 35 to the grid of pentode 26. The synchronizing signal 43 occurs at the end of the scan portion of the vertical cycle as triode 25 is nearing the end of its cutoff period and is amplified and inverted by pentode 26 and applied to the grid of triode 25. If the amplified pulse is of sufficient magnitude, it will drive the grid of triode 25 in a positive direction, out of cutoff and into conduction. This will in turn result in a negative pulse on the plate of triode 25 which is coupled to the grid of pentode 26 to thereby effect regenerative cutoff of the pentode. As can be seen from FIG. 3, the amplitude of the amplified synchronizing pulse **43*a* required to drive triode 25 out of cutoff is dependent upon the amount of discharge of the capacitor 32** at the time when the synchronizing pulse occurs.

In accordance with the invention, a bias potential is applied to the control grid of triode 25, which varies the voltage thereon as a function of the amplitude of the received signal. In the circuit illustrated in FIG. 2, the bias potential is derived from the automatic gain control circuitry 22. The output of video amplifier 15 is DC coupled to the control grid of a gated AGC detector, triode 45. Both the cathode and the anode of triode 45 are connected with a source of operating potential, B+, and the tube normally is cut off. The AGC detector conducts only during the synchronizing portion of the signal, so that the gain control potential is a true reflection of signal strength and is not affected by variations in picture content. Detector 45 is rendered conductive during occurrence of the synchronizing information by a positive pulse 46 applied to the plate, which pulse may be derived from the horizontal deflection circuitry, as is known. Connected with the plate of AGC detector 45 are filter networks 47 and 48 across which are developed appropriate automatic gain control potentials for the intermediate frequency and radiofrequency amplifiers, respectively. In the embodiment of the invention illustrated, the intermediate frequency gain control potential provides the control potential for modifying the free-running frequency of operation of the vertical multivibrator 20. This signal is connected through a voltage divider of series resistor 50 and shunt resistor 40 to the vertical hold potentiometer 37. Shunt capacitor 51 provides an AC path to ground.

Figure 3:
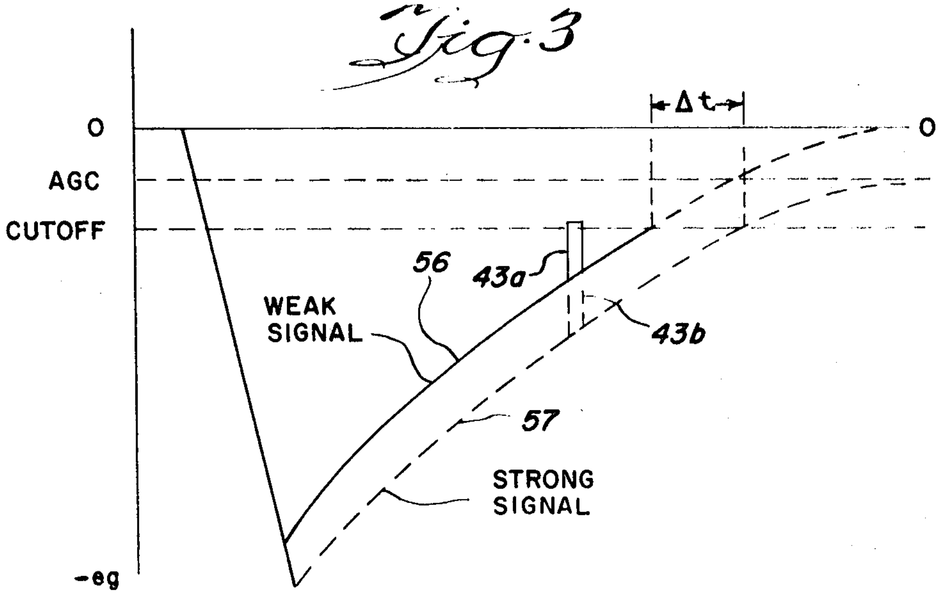
FIG. 3 is a waveform from the oscillator circuit, useful in understanding the operation of the invention.

The operation of the circuit is illustrated graphically in FIG. 3. The waveforms shown represent the signal on the control grid of triode 25 for one cycle of operation. The weak signal condition is shown as a solid line and the strong signal as a broken line. The initial portion 55 of the waveform occurs during the retrace portion of the cycle when triode 25 draws grid current and the grid goes negative. After triode 25 ceases conduction and pentode 26 conducts to cause scanning, the negative charge on capacitor 32 is dissipated exponentially, through potentiometer 37 and resistors 38, 33 and 31, and the voltage on the control grid rises toward zero. When the synchronizing pulse **43*a*** occurs, it drives the control grid positive, beyond the cutoff level causing the triode to conduct and starting the vertical retrace.

With a strong signal a greater (more negative) automatic gain control potential is applied to the control grid of triode 25 and the exponential discharge curve of capacitor 32 is offset negatively as indicated by broken line 57. Curve 57 illustrates how the added negative bias decreases the frequency of the multivibrator by increasing the time it takes capacitor 32 to discharge to the cutoff level. In FIG. 3 the time has been increased by an amount $\Delta t$.

It can also be seen from FIG. 3 that since the time of occurrence of the synchronizing pulse does not vary, the magnitude of the pulse required to drive the grid of tube 25 out of cutoff is greater. By increasing the required amplitude of synchronizing pulse, the circuit is rendered less susceptible to being triggered by noise pulses. Furthermore, if the synchronizing signal should be lost in a strong signal condition, the free-running frequency of the vertical deflection multivibrator is substantially below the repetition rate of the synchronizing pulse, and the circuit recovers rapidly. More particularly, in a specific embodiment of the system, it has been found desirable to have a free-running frequency of 59 Hz. with a weak signal and 51 Hz. with a strong signal.

I claim:

1. In a receiver for a television signal having periodic scan-synchronizing information and subject to variations in amplitude, a scan-generating circuit, comprising:
   - an oscillator having a free-running frequency which differs from the frequency of said scan-synchronizing information;
   - means for applying said scan-synchronizing information to said oscillator to modify the oscillator frequency in accordance with the frequency of the synchronizing information; and
   - means responsive to amplitude of the received signal for varying the free-running frequency of said oscillator.

2. The scan generating circuit of claim 1 in which said oscillator includes a circuit device which changes condition in accordance with a control potential, a circuit for developing a time varying control potential for said circuit device, means for adding said scan-synchronizing information to said time varying control potential and means for modifying the time varying control potential in accordance with the amplitude of said received signal.

3. The scan-generating circuit of claim 2 in which said oscillator is a relaxation oscillator.

4. The scan-generating circuit of claim 3 in which said relaxation oscillator is a multivibrator having one portion which conducts while the other portion is cut off during the scan period, said other portion having a control element to which said time varying control potential is applied, and means for varying a bias on said control element in accordance with the amplitude of said received signal.

5. The scan-generating circuit of claim 4 in which said receiver includes an automatic gain control circuit and the bias on said control element is established in accordance with the output thereof.

6. The scan-generating circuit of claim 4 including means for varying the potential on the control element of said other portion of the multivibrator to adjust the free-running frequency thereof.

7. The scan generating circuit of claim 2 wherein said control potential varies exponentially with time and said synchronizing information is combined therewith to reach a conduction threshold, and means for changing the relative level of said control potential in accordance with the amplitude of the received signal.

8. The scan generating circuit of claim 7 in which the free-running frequency of said oscillator is established at a frequency which is less than the frequency of the scan-synchronizing information and the difference between the two frequencies is a direct function of the amplitude of the received signal.

9. The scan-generating circuit of claim 1 in which said receiver includes an automatic gain control circuit and the free-running frequency of the oscillator is varied in accordance with the output thereof.